United States Patent
Ohmori

(10) Patent No.: US 10,340,529 B2
(45) Date of Patent: Jul. 2, 2019

(54) FUEL CELL

(71) Applicant: NGK INSULATORS, LTD., Nagoya-shi, Aichi (JP)

(72) Inventor: Makoto Ohmori, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 193 days.

(21) Appl. No.: 15/351,505

(22) Filed: Nov. 15, 2016

(65) Prior Publication Data

US 2017/0062838 A1  Mar. 2, 2017

Related U.S. Application Data

(63) Continuation of application No. PCT/JP2016/066969, filed on Jun. 7, 2016.

(30) Foreign Application Priority Data

Jun. 30, 2015 (JP) .................. 2015-130922

(51) Int. Cl.
*H01M 4/90* (2006.01)
*H01M 8/1231* (2016.01)
(Continued)

(52) U.S. Cl.
CPC ........... *H01M 4/9033* (2013.01); *C04B 35/01* (2013.01); *C04B 35/26* (2013.01);
(Continued)

(58) Field of Classification Search
CPC .... H01M 4/9033; H01M 4/90; H01M 4/9041; H01M 4/9066; H01M 4/9058
(Continued)

(56) References Cited

U.S. PATENT DOCUMENTS

2014/0051009 A1 * 2/2014 Ohno ................ H01M 8/04201
429/482
2015/0024302 A1 * 1/2015 Kobayashi .............. B32B 18/00
429/489

FOREIGN PATENT DOCUMENTS

JP  9-92304 A   4/1997
JP  10-247510 A  9/1998
(Continued)

OTHER PUBLICATIONS

International Search Report dated Aug. 9, 2016 for the corresponding International Application No. PCT/JP2016/066969.
(Continued)

*Primary Examiner* — Cynthia H Kelly
*Assistant Examiner* — Rashid A Alam
(74) *Attorney, Agent, or Firm* — Global IP Counselors, LLP

(57) ABSTRACT

A fuel cell comprises an anode, a cathode, a solid electrolyte layer, and a current collecting member. The cathode contains a perovskite composite oxide as a main component and contains a compound that includes at least one of S and Cr as a secondary component. The cathode has a surface facing the current collecting member. The surface of the cathode includes a first region that is electrically connected to the current collecting member and a second region that is separated from the current collecting member. The first region and the second region respectively contain a main phase that is configured from a perovskite composite oxide and a secondary phase that is configured from the compound. The occupied surface area ratio of the secondary phase in the first region is greater than the occupied surface area ratio of the secondary phase in the second region.

6 Claims, 2 Drawing Sheets

(51) Int. Cl.
| | |
|---|---|
| *H01M 4/86* | (2006.01) |
| *H01M 8/1246* | (2016.01) |
| *C04B 35/01* | (2006.01) |
| *C04B 35/26* | (2006.01) |
| *C04B 35/547* | (2006.01) |
| *H01M 8/124* | (2016.01) |

(52) U.S. Cl.
CPC ........ *C04B 35/2633* (2013.01); *C04B 35/547* (2013.01); *H01M 4/8647* (2013.01); *H01M 8/1231* (2016.02); *H01M 8/1246* (2013.01); *C04B 2235/3213* (2013.01); *C04B 2235/3227* (2013.01); *C04B 2235/3241* (2013.01); *C04B 2235/3272* (2013.01); *C04B 2235/3275* (2013.01); *C04B 2235/448* (2013.01); *C04B 2235/768* (2013.01); *H01M 2004/8689* (2013.01); *H01M 2008/1293* (2013.01); *Y02E 60/525* (2013.01); *Y02P 70/56* (2015.11)

(58) Field of Classification Search
USPC .......................................................... 429/489
See application file for complete search history.

(56) References Cited

FOREIGN PATENT DOCUMENTS

| | | | |
|---|---|---|---|
| JP | 2010-86762 A | 4/2010 | |
| JP | 2010-257738 A | 11/2010 | |
| JP | 2012-49115 A | 3/2012 | |
| JP | 5560381 B1 * | 7/2014 | ............. B32B 18/00 |
| JP | 2014-216297 A | 11/2014 | |

OTHER PUBLICATIONS

An English Translation of the Written Opinion of the International Search Authority for the corresponding international application No. PCT/JP2016/066969, dated Aug. 9, 2016.

An English Translation of the International Preliminary Report on Patentability for the corresponding international application No. PCT/JP2016/066969, dated Jan. 2, 2018.

Translation of International Search Report dated Aug. 9, 2016 for the corresponding International Application No. PCT/JP2016/066969.

* cited by examiner

FUEL CELL

TECHNICAL FIELD

The present invention relates to a fuel cell.

BACKGROUND ART

A typical fuel cell is known to include an anode, a cathode, and a solid electrolyte layer disposed between the anode and the cathode (For example, reference is made to Japanese Patent Application Laid-Open No. 2012-49115).

The cathode is connected to a current collecting member configured to electrically connect fuel cells.

SUMMARY OF INVENTION

However, the fuel cell output may be reduced by repetitive power generation. The present inventors have gained the new insight that one cause of an output reduction results from changes to the microstructure of the cathode, and that such microscopic structural changes tend to occur in a region of the cathode that exhibits a large current density.

The present invention is proposed based on the new insight above, and has the object of providing a fuel cell that enhances the durability of the cathode.

Solution to Problem

The fuel cell according to the present invention comprises an anode, a cathode, a solid electrolyte layer disposed between the anode and the cathode, and a current collecting member that is disposed on the cathode. The cathode contains a perovskite composite oxide as a main component and contains a compound that includes at least one of S and Cr as a secondary component. The surface of the cathode facing the current collecting member includes a first region that is electrically connected to the current collecting member and a second region that is separated from the current collecting member. The first region and the second region respectively contain a main phase configured by a perovskite composite oxide and a secondary phase that is configured by the compound. The occupied surface area ratio of the secondary phase in the first region is greater than the occupied surface area ratio of the secondary phase in the second region.

Advantageous Effects of Invention

The present invention provides a fuel cell that can enhance the durability of a cathode.

DESCRIPTION OF EMBODIMENTS

Figure 1:
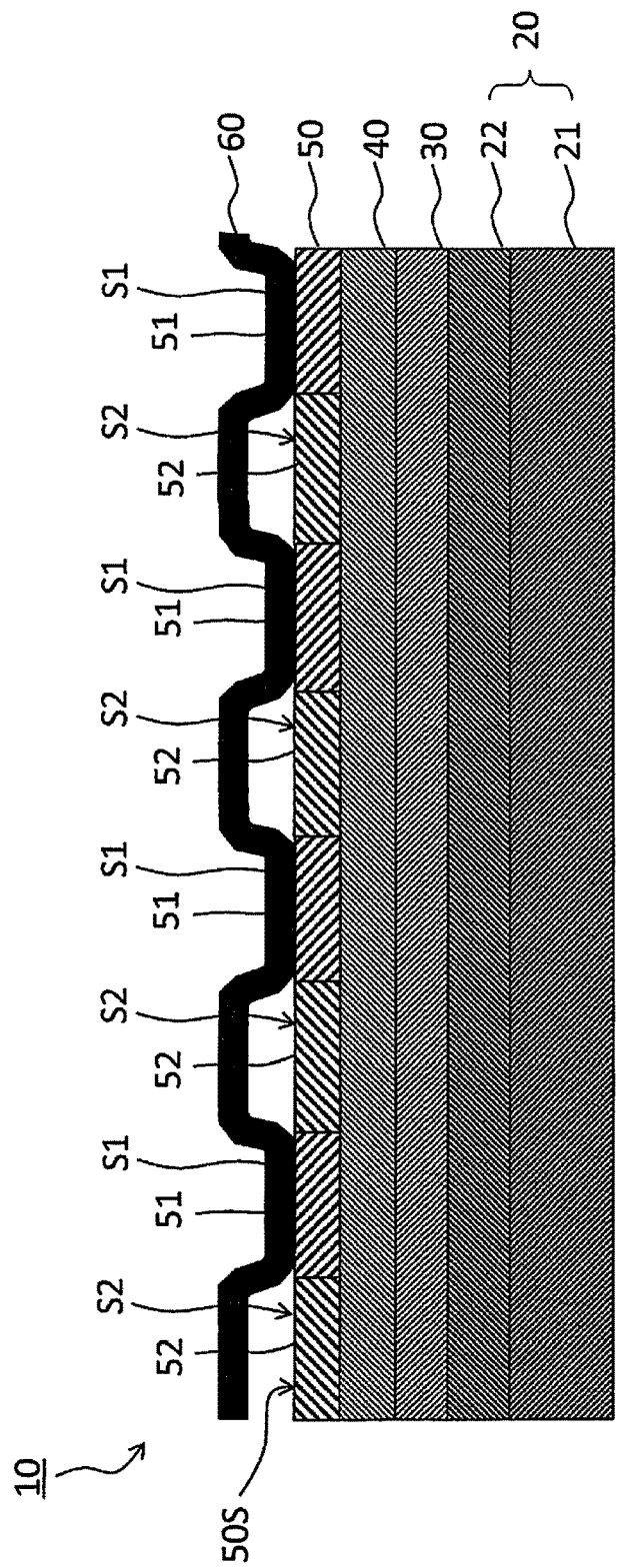
FIG. 1 is a cross sectional view illustrating a configuration of a fuel cell according to an embodiment.

An embodiment of the present invention will be described below making reference to the figures. Those aspects of configuration in the following description of the figures that are the same or similar are denoted by the same or similar reference numerals. However, the figures are merely illustrative, and the actual ratios or the like of the respective dimensions may differ. Therefore, the specific dimensions or the like should be determined by making reference to the following description. Alternatively, it is naturally the case that portions are included that exhibit a different ratio or relationship between dimensions in the respective figures.

Configuration of Fuel Cell 10

The configuration of the fuel cell 10 will be described making reference to the drawings. The fuel cell 10 is configured as a so-called solid oxide fuel cell (SOFC). The possible configurations of the fuel cell 10 include a flat-tubular type, a segmented-in-series type, a flat-plate type, an anode-supporting type, or a cylindrical type, or the like.

FIG. 1 is a cross sectional view illustrating the configuration of the fuel cell 10. The fuel cell 10 includes an anode 20, a solid electrolyte layer 30, a barrier layer 40, a cathode 50 and a current collecting member 60.

The anode 20 functions as the anode for the fuel cell 10. During operation of the fuel cell 10, a fuel gas (for example hydrogen gas) is supplied to the surface of the anode 20. As illustrated in FIG. 1, the anode 20 may include anode current collecting layer 21 and an anode active layer 22.

The anode current collecting layer 21 is configured as a porous body that exhibits superior gas permeability. The constituent material configuring the anode current collecting layer 21 includes use of a material that is used in the anode current collecting layer of a conventional SOFC, and for example, includes NiO (nickel oxide)-8YSZ (8 mol % of yttria-stabilized zirconia), or NiO—$Y_2O_3$ (yttria). However when NiO is included in the anode current collecting layer 21, at least a portion of the NiO may be reduced to Ni during operation of the fuel cell 10. The thickness of the anode current collecting layer 21 may be configured for example as 0.1 mm to 5.0 mm.

The anode active layer 22 is disposed on the anode current collecting layer 21. The anode active layer 22 is configured as a porous body that is denser than the anode current collecting layer 21. The constituent material for the anode active layer 22 includes use of a material used in an anode active layer of a conventional SOFC, and for example, includes NiO-8YSZ. However when NiO is included in the anode active layer 22, at least a portion of the NiO may be reduced to Ni during operation of the fuel cell 10. The thickness of the anode active layer 22 may be configured for example as 5.0 micrometers to 30 micrometers.

The solid electrolyte layer 30 is disposed between the anode 20 and the cathode 50. The solid electrolyte layer 30 in the present embodiment is sandwiched between the anode 20 and the barrier layer 40. The solid electrolyte layer 30 functions to enable permeation of oxygen ions that are produced by the cathode 50. The solid electrolyte layer 30 is configured by a material that is more dense that the anode 20 or the cathode 50.

The solid electrolyte layer 30 may contain $ZrO_2$ (zirconia) as a main component. In addition to zirconia, the solid electrolyte layer 30 may contain an additive such as $Y_2O_3$ (yttria) and/or $Sc_2O_3$ (scandium oxide). These additives function as a stabilizing agent. The mol composition ratio (stabilizing agent:zirconia) of the stabilizing agent to zirconia in the solid electrolyte layer 30 may be configured to approximately 3:97~20:80. Therefore the material used in the solid electrolyte layer 30 includes 3YSZ, 8YSZ, and 10YSZ, or ScSZ (zirconia stabilized with scandia), or the like. The thickness of the solid electrolyte layer 30 for example may be configured as 3 micrometers to 30 micrometers.

In the present embodiment, the term composition X "contains as a principal component" composition Y means that composition Y preferably occupies at least 70 wt % of the total of composition X, and more preferably occupies at least 90 wt %.

The barrier layer 40 is disposed between the solid electrolyte layer 30 and the cathode 50. The barrier layer 40 inhibits formation of a high resistivity layer between the solid electrolyte layer 30 and the cathode 50. The barrier layer 40 is configured by a material that is more dense that the anode 20 or the cathode 50. The barrier layer 40 may include a principal component of a ceria based material such as GDC (gadolinium-doped ceria), SDC (samarium-doped ceria), or the like. The thickness of the barrier layer 40 may be configured for example as 3 micrometers to 20 micrometers.

The cathode 50 is disposed on the barrier layer 40. The cathode 50 functions as a cathode for the fuel cell 10. The cathode 50 is configured as a porous body. The thickness of the cathode 50 is configured for example as 10 micrometers to 300 micrometers. The cathode 50 has a surface 50S that is provided on the opposite side to the solid electrolyte layer 30. The surface 50S faces the current collecting member 60. During operation of the fuel cell 10, an oxidant gas (for example, air) is supplied to the surface 50S. The current collecting member 60 is connected to the surface SOS of the cathode 50.

The main component of the cathode 50 is a perovskite composite oxide expressed by the general formula of $ABO_3$. This type of perovskite composite oxide includes LSCF ((La, Sr)(Co, Fe)$O_3$: lanthanum strontium cobalt ferrite), LSF: ((La, Sr) Fe$O_3$: lanthanum strontium ferrite), LSC: ((La, Sr)Co$O_3$: lanthanum strontium cobaltite), LNF ((La (Ni, Fe)$O_3$: lanthanum nickel ferrite), LSM ((La, Sr) Mn$O_3$: lanthanum strontium manganate), or the like. However there is no limitation in this regard. This type of perovskite composite oxide exhibits electrical conductivity.

The cathode 50 includes a compound containing at least one of S and Cr (referred to below for the sake of convenience as "compound") as a secondary component. This type of compound is preferably a sulfate or composite oxide. The sulfate includes strontium sulfate (for example, $SrSO_4$) or the like. The composite oxide includes strontium chromate (for example, $SrCrO_4$) or the like. The compound that configures the secondary component exhibits a lower conductivity than the perovskite composite oxide that configures the main component. That is to say, the conductance of the compound in the secondary component is lower than the conductance of the perovskite composite oxide in the main component. The compound in the secondary component may exhibit insulating properties.

In the present embodiment, the term composition X "contains as a secondary component" composition Z means that composition Z preferably occupies less than or equal to 30 wt % of the total of composition X, and more preferably occupies less than or equal to 10 wt %.

In addition to a compound containing at least one of S and Cr, the cathode 50 may contain a secondary component such as (Co, Fe)$_3O_4$ ($Co_2FeO_4$, $Co_{1.5}Fe_{1.5}O_4$, and $CoFe_2O_4$, or the like), $Co_3O_4$ (tricobalt tetroxide), or CoO (cobalt oxide), or the like.

In this context, the cathode 50 includes a first portion 51 and a second portion 52. The first portion 51 is a portion of the cathode 50 that is connected to the current collecting member 60. The second portion 52 is a portion of the cathode 50 that is not connected to the current collecting member 60. That is to say, the second portion 52 is a portion of the cathode 50 that is separated from the current collecting member 60, and is a portion of the cathode 50 other than the first portion 51.

There is no particular limitation in relation to the shape, size or position of the first portion 51, and for example, a disposition is possible in a matrix configuration at a predetermined interval. There is no particular limitation in relation to the shape, size or position of the second portion 52, and may be suitably determined with reference to the first portion 51.

The first portion 51 and the second portion 52 exhibit a difference in relation to the composition ratio of the perovskite composite oxide that is the main component and the secondary component compound.

The content ratio of the perovskite composite oxide that is the main component in the first portion 51 is smaller than the content ratio of the perovskite composite oxide that is the main component in the second portion 52. The perovskite composite oxide that is contained in the first portion 51 as the main component may be a different type from the perovskite composite oxide that is contained in the second portion 52 as the main component, but is preferably the same type.

The content ratio of the secondary component compound in the first portion 51 is larger than the content ratio of the secondary component compound in the second portion 52. The second portion 52 may omit the secondary component compound. The compound that is contained in the first portion 51 as a secondary component may be a different type from the compound that is contained in the second portion 52 as a secondary component, but is preferably the same type.

The current collecting member 60 is disposed on the cathode 50. The current collecting member 60 is electrically connected to the cathode 50 of the fuel cell 10 and to an anode of another fuel cell in proximity to the fuel cell 10. The current collecting member 60 includes use for example of a mesh material configured from a ferrite-based SUS material, but there is no limitation in this regard.

The current collecting member 60 is connected to the cathode 50 through an electrically conducting adhesive. The current collecting member 60 is electrically and mechanically connected to the first portion 51 of the cathode 50. The current collecting member 60 may be connected to the first portion 51 through the electrically conducting adhesive.

The current collecting member 60 is not mechanically connected with the second portion 52 of the cathode 50. The current collecting member 60 is mechanically separate from the second portion 52 of the cathode 50.

Configuration of Surface 50S of Cathode 50

The surface 50S of the cathode 50 includes a first region S1 and a second region S2.

The first region S1 is the surface of the first portion 51 of the cathode 50. The current collecting member 60 is electrically and mechanically connected to the first region S1.

There is no particular limitation in relation to the shape, size or position of the first region S1. When the first portion 51 is arranged in a matrix configuration, the first region S1 is also arranged in a matrix configuration in a plan view of the surface 50S. Although there is no particular limitation in relation to the occupied surface area ratio of the first region S1 in the surface 50S, it may be configured as greater than or equal to 10% and less than or, equal to 50%, and is preferably greater than or equal to 15% and less than or equal to 40%.

The first region S1 includes a main phase configured by a perovskite composite oxide and a secondary phase configured by a secondary component compound.

The second region S2 is a surface of the second portion 52 of the cathode 50. The current collecting member 60 is not mechanically connected to the second region S2. In the second region S2 that is not connected to the current collecting member 60, the current density tends to be small when compared to the first region S1 that is connected to the current collecting member 60.

There is no particular limitation in relation to the shape, size or position of the second region S2, and may be suitably determined with reference to the first region S1. Although there is no particular limitation in relation to the occupied surface area ratio of the second region S2 in the surface 50S, it may be configured as greater than or equal to 50% and less than or equal to 90%, and is preferably greater than or equal to 60% and less than or equal to 85%.

The second region S2 includes a main phase configured by a perovskite composite oxide as the main component. The second region S2 may omit inclusion of a secondary phase configured by the secondary component compound.

In this context, the current density in the first region that is connected to the current collecting member 60 tends to increase in comparison to the second region S2 that is not connected to the current collecting member 60. Thus, the occupied surface area ratio of the secondary phase in the first region S1 in the present embodiment is larger than the occupied surface area ratio of the secondary phase in the second region S2. In this manner, the current density difference between the first region S1 and the second region S2 can be reduced by inhibiting an excessive increase in the current density in the first region S1. As a result, microscopic structural changes in the cathode 50 can be inhibited.

The occupied surface area ratio of the secondary phase in the first region S1 is greater than or equal to 1.0% and less than or equal to 20%, and is preferably greater than or equal to 2.5% and less than or equal to 10%. The occupied surface area ratio of the main phase of the first region S1 is greater than or equal to 80% and is preferably greater than or equal to 90%. The method of calculation of the occupied surface area ratio is described below.

The occupied surface area ratio of the secondary phase in the second region S2 is greater than or equal to 0% and less than or equal to 3.0%, and is preferably greater than or equal to 0.3% and less than or equal to 1.8%. The occupied surface area ratio of the main phase in the second region S2 is greater than or equal to 95% and is preferably greater than or equal to 98%.

Method of Calculation of Occupied Surface Area of Secondary Phase

The method of calculation of the occupied surface area ratio of the secondary phase in the first region S1 will be described.

Firstly the surface 50S of the cathode 50 is polished with precision machinery.

Then an ion milling processing operation is performed on the surface 50S of the cathode 50 using an IM4000 manufactured by Hitachi High-Technologies Corporation.

Next, a backscattered electron image of the first region S1 enlarged with a magnification of 10,000 times by a field emission scanning electron microscope (FE-SEM) using a backscattered electron detector is obtained. The backscattered electron image can be obtained by an FE-SEM (model: ULTRA55) manufactured by Zeiss AG (Germany) with a working distance setting of 2 mm, and an acceleration voltage of 1 kV.

In the backscattered electron image acquired in the above manner, the contrast differs in relation to the display of the main phase (perovskite composite oxide), the secondary phase (a compound containing at least one of S and Cr) and gas phase (pores). The main phase is displayed as "faint gray", the secondary phase as "gray" and the pores as "black". In this manner, three values assigned in relation to the contrast can be realized by categorizing the luminosity of the image into 256 gradations.

However, the method of discriminating the main phase, the secondary phase and the gas phase is not limited to the use of a contrast based on a backscattered electron image. For example, after acquiring an element mapping in the same field by use of scanning electron energy dispersive X-ray spectroscopy (SEM-EDS), the composition of respective particles in the image are identified by illuminating and aligning the backscattered electron image to thereby arrive at three accurate values for the main phase, the secondary phase and the gas phase.

Then, the secondary phase in the backscattered electron image is specified by image analysis using HALCON image analysis software produced by MVTec GmbH (Germany) in relation to the backscattered electron image that includes three values for the main phase, the secondary phase and the gas phase.

Next, the total surface area of the secondary phase specified in the analysis image is calculated.

Next, the proportion of the total surface area of the secondary phase relative to the total surface area of the solid phase (main phase and secondary phase) minus the pores in the analysis image is calculated. The proportion of the total surface area of the secondary phase calculated in this manner is the occupied surface area ratio of the secondary phase in the first region S1.

When a third phase is present in addition to the secondary phase, the proportion of the total surface area of the secondary phase relative to the total surface area of the solid phase (only main phase and secondary phase) minus the third phase and the gas phase in the analysis image may be calculated.

The occupied surface area ratio of the main phase respectively in the first region S1 and the second region S2 or the occupied surface area ratio of the secondary phase in the second region S2 can also be calculated using the above method.

Method of Manufacturing Fuel Cell 10

Next, an example will be described of a manufacture method for the fuel cell 10.

Firstly, a green body for the anode current collecting layer 21 is formed by molding an anode current collecting layer material powder using a die press molding method.

Then, a slurry for the anode active layer is formed by adding PVA (polyvinyl alcohol) as a binder to a mixture of a pore forming agent (for example, PMMA) and the anode active layer material powder. The slurry for the anode active layer is printed onto the green body of the anode current collecting layer 21 using a printing method or the like to thereby form a green body for the anode active layer 22. The green body for the anode 20 is formed as described above.

Next, a slurry for the solid electrolyte layer is prepared by mixing terpineol and a binder with a solid electrolyte layer material powder. The slurry for the solid electrolyte layer is coated onto the green body of the anode active layer 22 using a printing method or the like to thereby form a green body for the solid electrolyte layer 30.

Next, a slurry for the barrier layer is prepared by mixing terpineol and a binder with a barrier layer material powder.

The slurry for the barrier layer is coated onto the green body of an barrier layer 40 using a printing method or the like to thereby form a green body for the barrier layer 40.

Next, the green bodies respectively for the anode 20, the solid electrolyte layer 30 and the barrier layer 40 are fired (1350 to 1450 degrees C., 1 to 20 hours) to form the anode 20, the solid electrolyte layer 30 and the barrier layer 40.

Then, the perovskite composite oxide material for the cathode (main component) and the compound material containing at least one of S and Cr (secondary component), water and a binder are mixed in a ball mill for 24 hours to prepare a slurry for the first portion. The content ratio of the compound material in the slurry for the first portion is set to be higher than the content ratio of the compound material in the slurry for the second portion as described below.

Then the slurry for the first portion is coated onto a predetermined position of the barrier layer surface to thereby form a green body for the first portion 51 of the cathode 50.

Then, the perovskite composite oxide material for the cathode, water and a binder are mixed in a ball mill for 24 hours to prepare a slurry for the second portion. Although a compound material containing at least one of S and Cr may be added, the content ratio of the compound material in the slurry for the second portion is set to be lower than the content ratio of the compound material in the slurry for the first portion.

Then a green body for the second portion 52 of the cathode 50 is formed by coating the slurry for the second portion to avoid the green body for the first portion 51 that is formed on the barrier layer surface. The green body for the cathode 50 is completed in the above manner.

The green body for the cathode 50 is fired (1000 to 1100 degrees C., 1 to 10 hours) to form the cathode 50.

Other Embodiments

The present invention is not limited to the above embodiment, and various changes or modifications may be added within a scope that does not depart from the scope of the invention.

Figure 2:
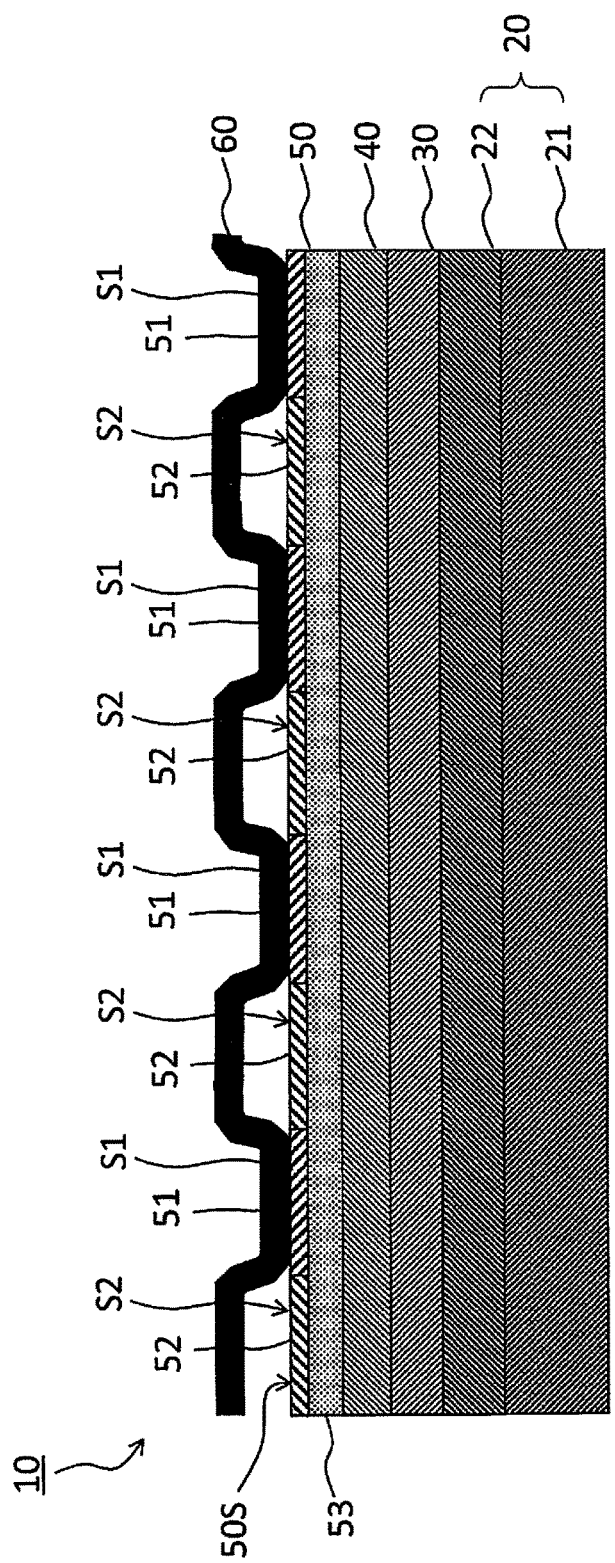
FIG. 2 is a cross sectional view illustrating a configuration of a cathode according to another embodiment.

In the above embodiment, although the cathode 50 includes a first portion 51 and a second portion 52, as illustrated in FIG. 2, a base portion 53 may be provided to support the first portion 51 and the second portion 52. The base portion 53 contains a main component of a perovskite composite oxide expressed by the general formula of $ABO_3$. The base portion 53 may contain a compound that includes at least one of S and Cr. Although there is no particular limitation in relation to the thickness of the first portion 51 and the second portion 52, it may be configured as greater than or equal to 1% and less than or equal to 30% of the thickness of the cathode, and is preferably greater than or equal to 5% and less than or equal to 20%.

The cathode 50 that includes the base portion 53 may be prepared in the following manner. Firstly, a slurry for the base portion formulated from water and a binder and a perovskite composite oxide is coated uniformly onto the barrier layer to thereby form the green body for the base portion 53. Next, the green body for the first portion 51 is formed at a predetermined position of the green body surface of the base portion 53, and the green body for the second portion 52 is formed in a region in which the green body surface is exposed. Thereafter, the green body for the first portion 51, the second portion 52 and the base portion 53 are fired (1000 to 1100 degrees C., 1 to 10 hours).

In this manner, even when the cathode 50 includes the first portion 51, the second portion 52 and the base portion 53, since the current density difference in the first region S1 and the second region S2 of the surface 50S of the cathode 50 can be reduced, it is possible to suppress microscopic structural changes in the cathode 50. Furthermore, the second portion 52 and the base portion 53 may be integrally formed when the secondary component compound is not included respectively in the second portion 52 and the base portion 53.

In the above embodiment, the fuel cell 10 includes a barrier layer 40. However, the barrier layer 40 may be omitted.

In the above embodiment, the barrier layer 40 has a monolayer configuration. However a laminated structure may be provided in which a dense barrier layer is laminated (randomly) with a porous barrier layer.

Although there is no particular disclosure in the above embodiment, there is no requirement for all of the first portion 51 of the cathode 50 to be connected to the current collecting member 60, and it is sufficient if a portion of the first portion 51 of all the first portion 51 is connected to the current collecting member 60. This configuration also enables suppression of microscopic structural changes in the first portion 51 that is connected to the current collecting member 60.

Although there is no particular disclosure in the above embodiment, there is no requirement for all of the connecting portion of the current collecting member 60 to be connected to the first portion 51, and it is sufficient if a portion of the connecting portion of all the connecting portion is connected to the first portion 51. This configuration also enables suppression of microscopic structural changes in the first portion 51 that is connected to the current collecting member 60.

EXAMPLES

Although the examples of a cell according to the present invention will be described below, the present invention is not thereby limited to the following examples.

Preparation of Samples No. 1 to No. 9

A fuel cell according to Samples No. 1 to No. 9 is prepared as described below.

Firstly, a mixed powder is prepared by drying a slurry of a mixture of IPA and a compounding powder of a pore-forming agent (PMMA), $Y_2O_3$ powder and NiO powder in a nitrogen atmosphere.

Next, uniaxial pressing (compaction pressure 50 MPa) is applied to the mixed powder to form a plate of 30 mm length×30 mm width and a thickness of 3 mm. A green body for the anode current collecting layer is prepared by further consolidation of the plate by use of a CIP (compaction pressure: 100 MPa).

Next, the slurry formed from a mixture of IPA and a compounding powder of PMMA and NiO-8YSZ is coated onto the green body for the anode current collecting layer to thereby prepare a green body for the anode active layer.

Next, a slurry for the solid electrolyte layer is prepared by mixing terpineol and a binder with 8YSZ. Then the slurry for the solid electrolyte layer is coated onto the green body of the anode to thereby form a green body for the solid electrolyte layer.

Then a GDC slurry is prepared, and the GDC slurry is coated onto the green body for the solid electrolyte layer to thereby prepare a green body for the barrier layer.

Next, the green bodies respectively for the anode, the solid electrolyte layer and the barrier layer are fired (1450 degrees C., 5 hours) to form the anode, the solid electrolyte layer and the barrier layer.

Next, the secondary phase material ($SrSO_4$ and/or $SrCrO_4$) is added to the main phase material (LSCF or LSF) as shown in Table 1 and mixed with terpineol and a binder to thereby prepare a slurry for the first portion. At that time, the mixing ratio of the main phase material and the secondary phase material is adjusted so that the occupied surface area ratio of the secondary phase in the first region is different for each sample.

Then, the slurry for the first portion is coated onto a predetermined position of the barrier layer surface to thereby form a green body for the first portion.

Then, the secondary phase material ($SrSO_4$ and/or $SrCrO_4$) is added to the main phase material (LSCF or LSF) as shown in Table 1 and mixed with terpineol and a binder to thereby prepare a slurry for the second portion.

Then, the slurry for the second portion is coated onto in a region in which the barrier layer surface is exposed to thereby form a green body for the second portion. The green body for the cathode is thereby completed.

The green body for the cathode is fired (1100 degrees C., 1 hour) to form the cathode.

A SUS mesh is connected through a conductive coupling material (($Mn, Co)_3O_4$)) to the first region that is the surface of the first portion in the cathode.

Preparation of Sample No. 10

Apart from preparing the green body for the second portion by use of a slurry for the second portion in which the main phase material (LSCF) is mixed with terpineol and a binder without addition of the secondary phase material, Sample No. 10 is prepared in the same manner as Sample No. 1 to No. 9. Therefore the secondary phase is not included in the second region of the cathode surface in Sample No. 10.

Preparation of Sample No. 11

Apart from preparing the cathode by use of a cathode slurry in which the main phase material (LSCF) is mixed with terpineol and a binder without addition of the secondary phase material, Sample No. 11 is prepared in the same manner as Sample No. 1 to No. 9. Therefore, the first region is not provided on the surface of the cathode in Sample No. 11, and the entire surface has the same configuration as the second region in Samples No. 1 to No. 10.

Measurement of Occupied Surface Area Ratio

The surface of the cathode of Samples No. 1 to No. 10 is polished with precision machinery, and then ion milling processing is performed using an IM4000 manufactured by Hitachi High-Technologies Corporation.

A backscatter electron image of the cross section of the cathode enlarged with a magnification of 10,000 times by a FE-SEM using a backscatter electron detector is acquired.

Then, an analysis image is acquired by analyzing the backscatter electron image for each sample using HALCON image analysis software produced by MVTec GmbH.

Then, the occupied surface area ratio of the secondary phase configured by $SrSO_4$ or $SrCrO_4$ is calculated with reference to the analysis image respectively for the first region and the second region. The calculation results for the occupied surface area ratio of the secondary phase are shown in Table 1.

Durability Testing

Samples No. 1 to No. 11 are heated to 750 degrees C. while supplying nitrogen gas to the anode side and air to the cathode side. When reaching a temperature of 750 degrees C., hydrogen gas is supplied to the anode to perform a reduction process for 3 hours.

Next, a voltage drop rate per 1000 hours is measured as a deterioration rate. The output density at a rated current density value of 0.2 A/cm$^2$ and at a temperature of 750 degrees C. is used. The measurement results are summarized in Table 1. In Table 1, a good state for the deterioration rate of less than or equal to 1.0% is denoted by (O), a low deterioration rate of less than or equal to 0.5% is denoted by (⊚), and a deterioration rate exceeding 1.0% is denoted by (X).

TABLE 1

| Sample No. | Main Phase Material | Secondary Phase Material | Occupied Surface Area Ratio of Secondary Phase in First Region (%) | Occupied Surface Area Ratio of Secondary Phase in Second Region (%) | Deterioration Rate (%) | Evaluation Result |
| --- | --- | --- | --- | --- | --- | --- |
| 1 | (La, Sr)FeO$_3$ | SrSO$_4$ | 0.9 | 0.1 | 0.77 | O |
| 2 | (La, Sr)(Co, Fe)O$_3$ | SrCrO$_4$ | 1.4 | 0.2 | 0.83 | O |
| 3 | (La, Sr)(Co, Fe)O$_3$ | SrSO$_4$ | 2.5 | 0.3 | 0.25 | ⊚ |
| 4 | (La, Sr)FeO$_3$ | SrCrO$_4$ | 4.8 | 0.5 | 0.15 | ⊚ |
| 5 | (La, Sr)(Co, Fe)O$_3$ | SrSO$_4$SrCrO4 | 6.3 | 0.8 | 0.42 | ⊚ |
| 6 | (La, Sr)(Co, Fe)O$_3$ | SrSO$_4$ | 8.2 | 1.1 | 0.23 | ⊚ |
| 7 | (La, Sr)FeO$_3$ | SrCrO$_4$ | 9.4 | 1.4 | 0.33 | ⊚ |
| 8 | (La, Sr)(Co, Fe)O$_3$ | SrSO$_4$ | 10 | 1.8 | 0.48 | ⊚ |
| 9 | (La, Sr)(Co, Fe)O$_3$ | SrSO$_4$ | 13 | 2.5 | 0.66 | O |
| 10 | (La, Sr)FeO$_3$ | SrCrO$_4$ | 3.2 | 0.0 | 0.79 | O |
| 11 | (La, Sr)(Co, Fe)O$_3$ | non | — | — | 1.9 | X |

As shown in Table 1, Samples No. 1 to No. 10 in which the occupied surface area ratio of the secondary phase in the first region is larger than the second region exhibit a reduction in the deterioration rate when compared with Sample No. 11 in which the first region is not provided. This feature is due to inhibiting microscopic structural changes in the cathode by reducing the conductance of the first region that exhibits a tendency for the current density to increase, and by reducing the current density difference between the first region and the second region.

As shown in Table 1, Sample No. 3 to No. 8 in which the occupied surface area ratio of the secondary phase in the first region is greater than or equal to 2.5% and less than or equal to 10%, and the occupied surface area ratio of the secondary phase in the second region is greater than or equal to 0.3% and less than or equal to 1.8% are confirmed to exhibit a further reduction in the deterioration rate.

The invention claimed is:

1. A fuel cell comprising an anode, a cathode supplied with an oxidant gas, a solid electrolyte layer disposed between the anode and the cathode, and a current collecting member disposed on the cathode, wherein the cathode contains a perovskite composite oxide as a principal component and contains a compound that includes at least one of S and Cr as a secondary component, a surface of the cathode facing the current collecting member includes a first region that is electrically and physically connected to the current collecting member and a second region that is separated from the current collecting member, the first region and the second region respectively contain a main phase that is configured from the perovskite composite oxide and a secondary phase that is configured from the compound, and an occupied surface area ratio of the secondary phase in the first region is greater than an occupied surface area ratio of the secondary phase in the second region.

2. The fuel cell according to claim 1, wherein
the occupied surface area ratio of the secondary phase in the first region is greater than or equal to 2.5% and less than or equal to 10%, and
the occupied surface area ratio of the secondary phase in the second region is greater than or equal to 0.3% and less than or equal to 1.8%.

3. The fuel cell according to claim 1, wherein
a conductance of the compound is lower than a conductance of the perovskite composite oxide.

4. The fuel cell according to claim 1, wherein
the cathode includes a first portion and a second portion,
the first region is a surface of the first portion,
the second region is a surface of the second portion, and
the first portion and the second portion have different content ratios of the perovskite composite oxide and the compound.

5. The fuel cell according to claim 4, wherein
a content ratio of the perovskite composite oxide in the first portion is smaller than a content ratio of the perovskite composite oxide in the second portion.

6. The fuel cell according to claim 4, wherein
a content ratio of the compound in the first portion is larger than a content ratio of the compound in the second portion.

* * * * *